(12) United States Patent
Cobianu et al.

(10) Patent No.: US 7,651,879 B2
(45) Date of Patent: Jan. 26, 2010

(54) SURFACE ACOUSTIC WAVE PRESSURE SENSORS

(75) Inventors: Cornel P. Cobianu, Bucharest (RO); Ioan Pavelescu, Bucharest (RO); Viorel V. Avramescu, Bucharest (RO); James D. Cook, Freeport, IL (US); Leonard J. McNally, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 534 days.

(21) Appl. No.: 11/164,845

(22) Filed: Dec. 7, 2005

(65) Prior Publication Data

US 2007/0126072 A1 Jun. 7, 2007

(51) Int. Cl.
*H01L 21/00* (2006.01)

(52) U.S. Cl. .................... 438/50; 257/E27.006; 29/594; 29/602.1; 29/609.1

(58) Field of Classification Search .................. 29/594, 29/602.1, 609.1; 438/50; 257/E27.006
See application file for complete search history.

(56) References Cited

U.S. PATENT DOCUMENTS

| | | | |
|---|---|---|---|
| 4,100,811 A | 7/1978 | Cullen et al. | |
| 4,216,401 A | 8/1980 | Wagner | |
| 4,295,102 A | 10/1981 | Schmidt et al. | |
| 4,296,347 A | 10/1981 | Weirauch | |
| 4,317,372 A | 3/1982 | Hartemann | |
| 4,480,148 A | 10/1984 | Archer | |
| 4,699,682 A | 10/1987 | Takishima | |
| 5,010,270 A | 4/1991 | Greer | |
| 5,059,848 A | 10/1991 | Mariani | |
| 5,091,051 A | 2/1992 | Greer | |
| 5,237,235 A | 8/1993 | Cho et al. | |
| 5,303,457 A | 4/1994 | Falkner et al. | |
| 5,337,026 A | 8/1994 | Borchelt et al. | |
| 5,345,201 A | 9/1994 | Greer et al. | |
| 5,594,979 A | 1/1997 | Borchelt et al. | |

(Continued)

FOREIGN PATENT DOCUMENTS

DE 102004004476 7/2005

(Continued)

OTHER PUBLICATIONS

Weirauch et al., "Saw Resonator Frit-Bonded Pressure Transducer," IEEE, Ultrasonics Symposium, pp. 874-877, 1979.

*Primary Examiner*—Davienne Monbleau
*Assistant Examiner*—Matthew Reames
(74) *Attorney, Agent, or Firm*—Crompton, Seager & Tufte

(57) ABSTRACT

Improved SAW pressure sensors and manufacturing methods thereof. A SAW wafer including a number of SAW transducers disposed thereon may be provided. A cover wafer may also be provided, with a glass wall situated between the cover wafer and the SAW wafer. The cover wafer may be secured to the SAW wafer such that the glass wall surrounds the SAW transducers. In some instances, the glass wall may define, at least in part, a separation between the cover wafer and the SAW wafer. One or more contours may also be provided between the cover wafer and the SAW wafer such that at least one of the contours surrounds at least one of the SAW transducers when the cover wafer is disposed over and secured relative to the SAW wafer.

17 Claims, 5 Drawing Sheets

U.S. PATENT DOCUMENTS

| | | | |
|---|---|---|---|
| 5,729,185 | A | 3/1998 | Johnson et al. |
| 6,003,378 | A | 12/1999 | Scherr et al. |
| 6,018,211 | A | 1/2000 | Kanaboshi et al. |
| 6,287,894 | B1 | 9/2001 | Sawin |
| 6,345,424 | B1 * | 2/2002 | Hasegawa et al. .......... 29/25.35 |
| 6,722,030 | B1 | 4/2004 | Stelzl et al. |
| 6,907,787 | B2 | 6/2005 | Cook et al. |
| 6,962,084 | B2 | 11/2005 | Gall |
| 6,964,198 | B2 | 11/2005 | Eisenhower, Jr. |
| 2001/0011857 | A1 | 8/2001 | Morishima |
| 2002/0078757 | A1 | 6/2002 | Hines et al. |
| 2003/0111437 | A1 * | 6/2003 | Barber et al. .................. 216/2 |
| 2004/0100164 | A1 * | 5/2004 | Murata et al. ................ 310/348 |
| 2004/0159960 | A1 * | 8/2004 | Fujiwara et al. ............. 257/783 |
| 2004/0216526 | A1 * | 11/2004 | Cook et al. .................... 73/708 |

FOREIGN PATENT DOCUMENTS

| | | |
|---|---|---|
| EP | 1427032 | 9/2004 |
| WO | WO 0231461 | 4/2002 |
| WO | WO 03081195 | 10/2003 |

* cited by examiner

SURFACE ACOUSTIC WAVE PRESSURE SENSORS

TECHNICAL FIELD

The present invention relates generally to SAW (surface acoustic wave) sensors, and more specifically to wafer level packaging of SAW sensors. In particular, the present invention relates to methods of forming a number of SAW sensors simultaneously.

BACKGROUND

SAW devices can be used to measure a variety of strain-related properties such as temperature, stress, acceleration, and other mechanical parameters, via suitably arranged SAW transducers typically employing a deformable piezoelectric material. Examples of known piezoelectric material include quartz, lithium niobate, lithium tantalate, and treated composites bearing a thin film of a material such as zinc oxide.

In some instances, SAW sensors may be used in measuring pressure. A need remains for improved SAW sensors adapted for measuring pressure, including air pressure within a tire, as well as other applications. A need remains for effective, low-cost manufacturing methods of such SAW sensors.

SUMMARY

The present invention relates to improved SAW sensors adapted for measuring pressure, as well as to effective, low-cost manufacturing methods of such SAW sensors. A SAW sensor includes any SAW device, such as a SAW delay line, SAW resonator, and the like, which can be used for sensing a physical or chemical condition.

An example embodiment of the present invention may be found in a method of simultaneously producing a number of SAW sensors. In the example method, a SAW wafer having a number of SAW transducers disposed thereon is provided. A cover wafer is also provided, and a protective wall is provided between the SAW wafer and the cover wafer such that an interior portion of the SAW wafer and an interior portion of the cover wafer are protected and sealed against the outside. The cover wafer may be disposed over the SAW wafer such that the protective wall surrounds the SAW transducers. In some cases, the protective wall may be a protective glass frit wall and may provide and define, at least in part, a separation between the cover wafer and the SAW wafer. In some instances, the glass wall may bond the SAW wafer to the cover wafer.

In some instances, a number of raised contours may also be provided between the cover wafer and the SAW wafer such that at least one of the raised contours surrounds at least one of the SAW transducers when the cover wafer is disposed over and secured relative to the SAW wafer. In some cases, the SAW wafer may be a quartz SAW wafer, and the cover wafer may be a quartz cover wafer, but this is not required in all embodiments.

After the cover wafer and SAW wafer are secured together, a back side of the SAW wafer may be patterned, such as by etching, to form a number of pressure-sensing diaphragms, each corresponding to an individual pressure sensor on the SAW wafer. In some instances, patterning the SAW wafer includes forming a patterned metal layer on the SAW wafer and a protective metal layer on the cover wafer. The protective metal layer and the glass wall may protect the SAW wafer and the cover wafer during etching.

A subsequent dicing process may include making a first series of cuts through the cover wafer without cutting the SAW wafer. A second series of cuts may be made through the cover wafer without cutting the SAW wafer, the second series of cuts being parallel to the first series of cuts. A third series of cuts may be made through the cover wafer and the SAW wafer, the third series of cuts being orthogonal to the first series of cuts and the second series of cuts. A fourth series of cuts may be made through the cover wafer and the SAW wafer, the fourth series of cuts being orthogonal to the third series of cuts.

In some cases, a wall trench may be provided in the cover wafer, and the protective wall may be provided at least partially within the wall trench. In some cases, a number of contour trenches may also be provided in the cover wafer, and the raised contours may be provided at least partially within the contour trenches.

Another example embodiment of the present invention may be found in a quartz stack including a quartz SAW wafer and a quartz cover wafer. A number of SAW transducers may be provided on a surface of the quartz SAW wafer. A glass frit wall may be provided between the quartz SAW wafer and the quartz cover wafer such that the glass frit wall surrounds the SAW transducers. The glass frit wall may secure the quartz SAW wafer to the quartz cover wafer. A number of glass contours may also be provided between the quartz SAW wafer and the quartz cover wafer such that at least one of the glass contours surrounds at least one of the SAW transducers. In some instances, at least one of the glass contours is a rectangular glass frit contour, but this is not required.

The glass frit wall may have a height that defines a spacing between the quartz SAW wafer and the quartz cover wafer. Alternatively, the glass frit wall may, in some instances, have a height that is greater than the spacing between the quartz SAW wafer and the quartz cover wafer. In such cases, the quartz cover wafer may include a wall trench, and the glass frit wall may be at least partially disposed within the wall trench. The quartz cover wafer may also include a number of contour trenches, in which case, the glass contours can be at least partially disposed within the contour trenches.

A SAW pressure sensor may be separated from the glass frit bonded wafers by dicing the quartz stack described above. The SAW pressure sensor may include a pressure reference chamber that is formed by a portion of the SAW wafer bearing a SAW transducer, a portion of the cover wafer and one of the glass contours. The pressure reference chamber may bear a desired reference pressure as a result of the pressure reference chamber being sealed at the desired reference pressure. In some instances, the SAW pressure sensor may include an overpressure stop, but this is not required.

In some instances, the cover wafer portion may be smaller than the SAW wafer portion as a result of the dicing process used to separate the SAW pressure sensor from the quartz stack. The SAW pressure sensor may further include conductive leads that are disposed on the SAW wafer portion and that extend outwardly from the SAW transducer beyond the cover wafer portion.

The above summary of the present invention is not intended to describe each disclosed embodiment or every implementation of the present invention. The Figures, Detailed Description and Examples which follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
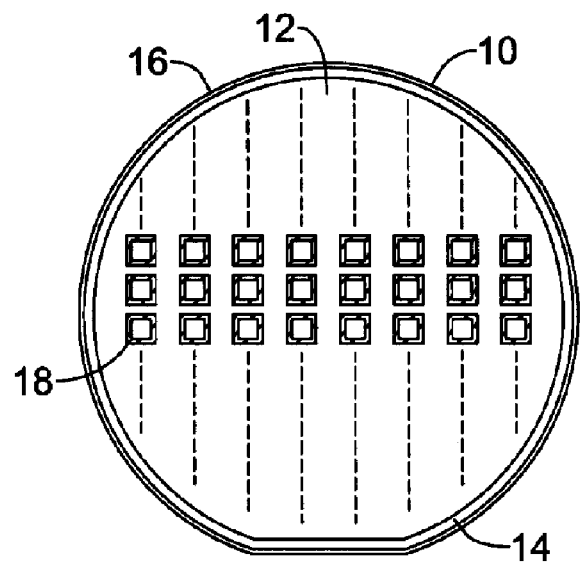
FIG. 1 is a top view of a cover wafer in accordance with an illustrative embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 is a top view of an illustrative cover wafer 10. In some instances, cover wafer 10 may include or be formed from quartz, but this is not required. The illustrative cover wafer 10 has a top surface 12 bearing several structures of interest. A protective wall, such as a glass wall 14, may be positioned on the top surface 12, proximate a periphery 16 of the cover wafer 10. In some instances, glass wall 14 may be disposed about 1 or 2 millimeters inward from periphery 16 of the cover wafer 10. However, it is contemplated that the glass wall 14 may be spaced inward any suitable distance from the periphery 16 of the cover wafer 10.

Glass wall 14 may be formed having any suitable dimensions. For example, and in some cases, glass wall 14 may be about 2 or 3 millimeters in width (parallel to top surface 12) and about 15 to 75 micrometers in height (orthogonal to top surface 12). In some instances, glass wall 14 may be a glass frit wall, formed using known glass frit techniques such as screen printing.

In the illustrative embodiment, a number of raised contours 18 may also be provided on surface 12. In some instances, the raised contours 18 may be glass frit contours formed using known glass frit techniques such as screen printing, but this is not required. The illustrated embodiment of FIG. 1 shows a total of twenty four raised contours 18 disposed on surface 12. It should be noted, however, that surface 12 may include fewer or more raised contours 18, as desired. In some instances, surface 12 may include many more raised contours 18, sometimes evenly disposed about most of surface 12. At least some of the raised contours 18 may be dimensioned to surround a SAW transducer when the cover wafer 10 is disposed over and secured to a SAW wafer. In some instances, raised contours 18 may have a largely rectangular shape, and may be dimensioned to accommodate the particular SAW transducer or transducers used, but this is not required.

Figure 2:
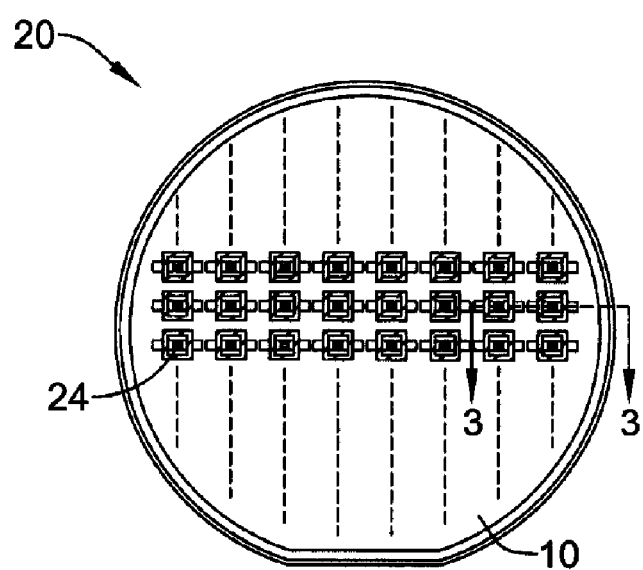
FIG. 2 is a top view of a stack incorporating the cover wafer of FIG. 1.
Figure 3:
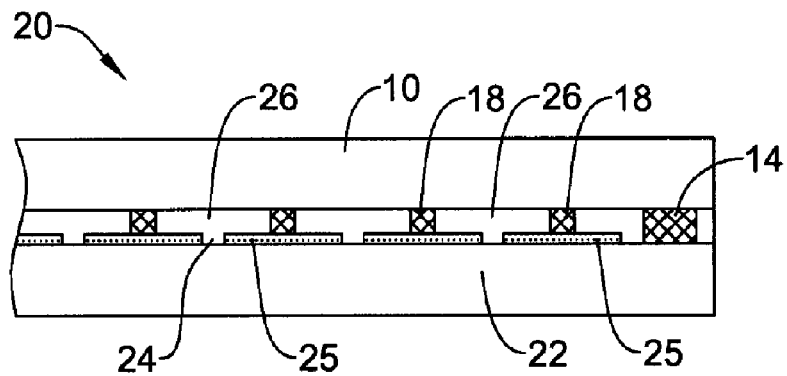
FIG. 3 is a partial cross-sectional side view taken through FIG. 2 at line 3-3.

FIG. 2 shows an illustrative stack 20 in which cover wafer 10 has been inverted and disposed over a SAW wafer 22, as better seen in FIG. 3. Cover wafer 10 may be secured to SAW wafer 22 using any suitable technique. For example, cover wafer 10 may be secured to SAW wafer 22 using a thermal annealing process, which may be performed at a temperature of about 450 degrees C. In some instances, SAW wafer 22 may be a quartz wafer.

Figure 6:
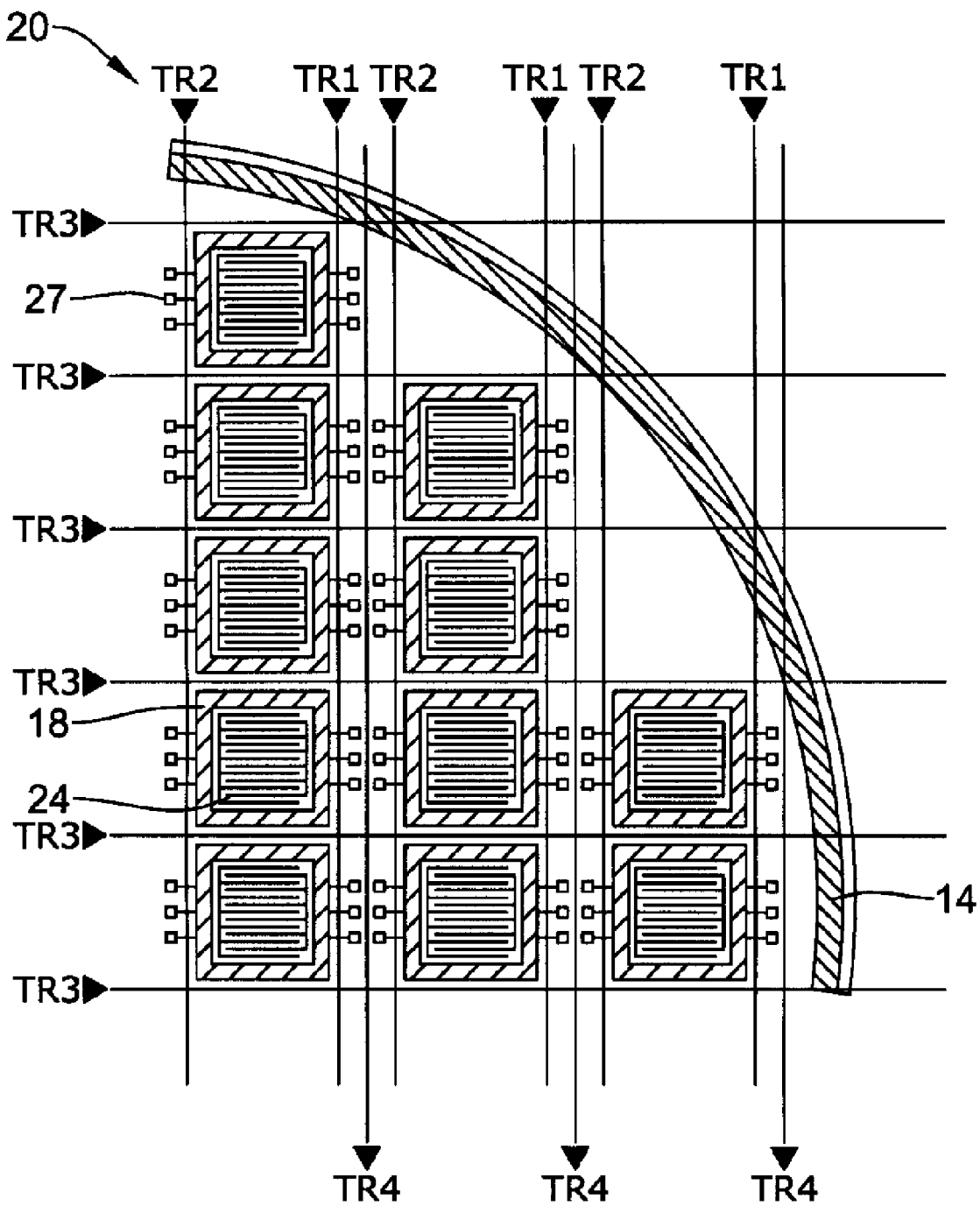
FIG. 6 is a partial top view of the stack of FIG. 2, showing a dicing pattern.

As best illustrated in FIG. 6, a number of SAW transducers 24 may be disposed on SAW wafer 22. The SAW transducers 24 do not appear in detail in FIGS. 2 and 3, as these are cross-sections. SAW transducers 24 may be formed upon SAW wafer 22 using any suitable technique such as a metallization process. SAW transducers 24 may be inter-digitized SAW transducers. It should be noted that the wafer-level packaging described herein may be applicable to sealing other quartz devices as well.

It can be seen that raised contours 18 may be dimensioned to surround SAW transducers 24, while permitting related circuitry and/or conductive leads 25 (shown schematically in FIGS. 3-5) to extend beyond raised contours 18. Circuitry and/or conductive leads 25 is best described with respect to FIG. 6. In FIG. 6, circuitry and/or conductive leads 25 can be seen as including several conductive leads ending with conductive pads 27. While the illustrative embodiment shows three conductive leads ending with three conductive pads 27 extending from either side of each SAW transducer 24, it will be appreciated that in some cases, only two leads ending with conductive pads 27 or less, or perhaps four or more leads ending with conductive pads 27, may extend from each SAW transducer 24, as desired.

As a result, electrical communication with SAW transducers 24 may be achieved without impacting sealing around SAW transducers 24. FIG. 3 also shows that glass wall 14, in the illustrated embodiment, defines a separation between cover wafer 10 and SAW wafer 22. This separation, as will be discussed subsequently, may in some cases provide advantages during dicing steps. Moreover, as will be discussed, this separation may help define a relatively large pressure reference chamber 26, when desired.

Figure 4:
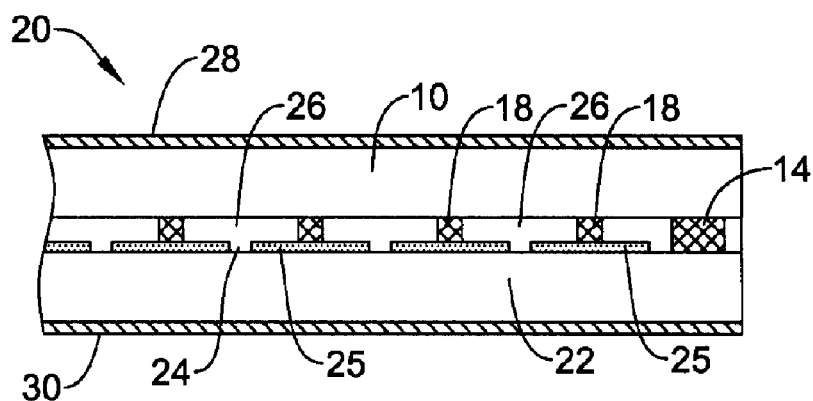
FIG. 4 is a view of the partial cross-section of FIG. 3, showing a subsequent processing step in accordance with an illustrative embodiment of the present invention.

In order to form a SAW pressure sensor, it may be useful to provide a pressure sensing diaphragm by deep wet etching of the quartz on the back side of the quartz wafer 22. One way to accomplish this, and as shown in FIG. 4, includes forming a front side protective masking layer 28 and a back side masking layer 30. Layer 28 and layer 30 may be formed of any suitable material using any suitable techniques. In some instances, layer 28 and layer 30 may both be metallic layers such as a Cr/Au layer deposited using techniques such as sputtering, vapor deposition, and the like.

Figure 5:
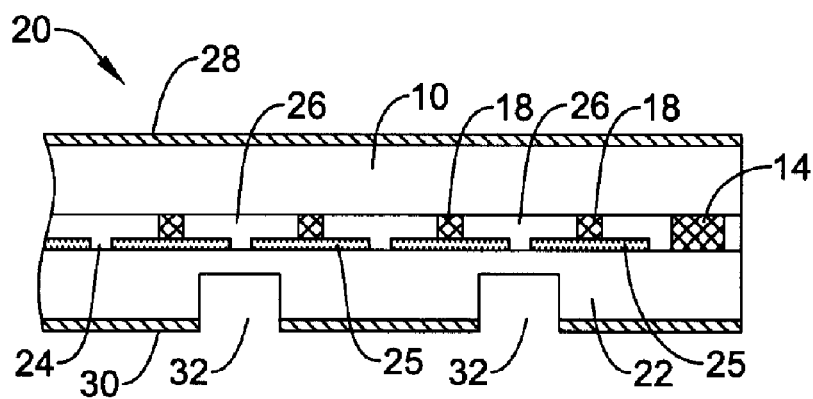
FIG. 5 is a view of the partial cross-section of FIG. 4, showing a subsequent processing step in accordance with an illustrative embodiment of the present invention.

In FIG. 5, it can be seen that back side masking layer 30 has been patterned. This patterning may be accomplished using any suitable technique such as a photolithographic process. In some instances, it may be useful to employ a double side aligner so that the future pressure diaphragm is correctly aligned with respect to the corresponding SAW transducer 24.

Once patterning has been complete, deep wet etching of a portion of the back side of SAW wafer 22 may be completed. This may results in voids 32 that will eventually form and release the pressure diaphragms. It should be noted that during deep etching, glass wall 14 may help protect SAW transducers 24 from damage that may otherwise result from the deep etching process. While a portion of glass wall 14 may be etched away by the etchant, glass wall 14 may have sufficient width to largely withstand the etching process. If there is a high etch rate of the glass wall with respect to the quartz etching, a local laser densification treatment may be performed on glass wall 14 to decrease the etching rate. Once the etching step has occurred, front side protective masking layer 28 and back side masking layer 30 may be removed using any suitable technique.

Figure 7:
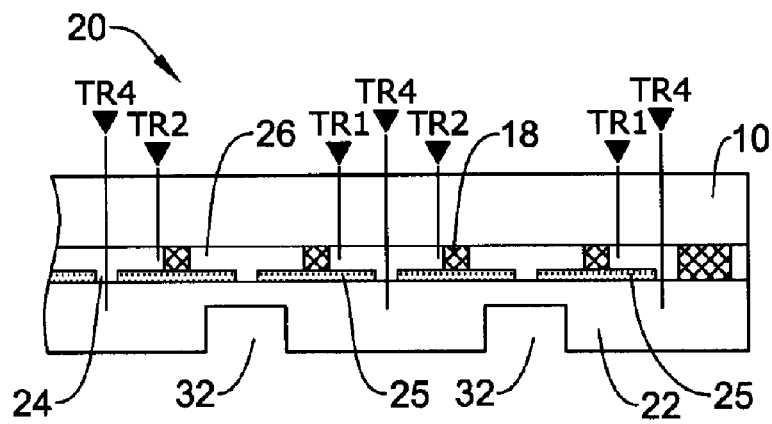
FIG. 7 is a partial cross-section of the stack of FIG. 6.

FIGS. 6 and 7 show, in combination, an illustrative dicing or cutting pattern for cutting stack 20 to form a number of individual SAW pressure sensors. In an initial cutting step, cover wafer 10 may be cut along the direction TR1. As can be seen in FIG. 7, this cutting may penetrate completely through cover wafer 10 but not contact SAW wafer 22. In a second cutting step, cover wafer 10 may be cut along the direction TR2, which in the illustrative embodiment, is parallel to direction TR1. Once again, this cutting step may penetrate completely through cover wafer 10 but not contact SAW wafer 22.

Figure 8:
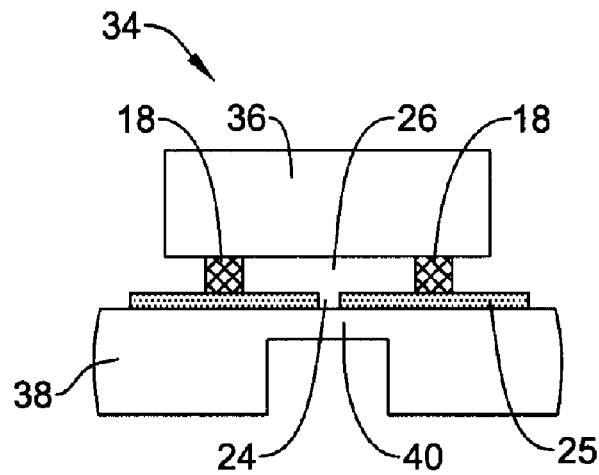
FIG. 8 is a cross-sectional side view of a SAW sensor formed by the dicing pattern shown in FIGS. 6 and 7.

Next, a series of cuts may be made along direction TR3, which in the illustrative embodiment, may be perpendicular to directions TR1 and TR2. This cutting step may penetrate completely through both cover wafer 10 and SAW wafer 22. In a further cutting step, a series of cuts may be made along direction TR4, which in the illustrative embodiment, are perpendicular to direction TR3 and thus parallel to directions TR1 and TR2. As a result of these cutting processes, stack 20 may be reduced to a number of individual SAW pressure sensors 34, as shown in FIG. 8. In some instances, as illustrated, it can be noted that as a result of the dicing process, there is no cover above at least a portion of the electrodes 25 and conductive pads 27, which permits electrical communication between the SAW pressure sensor 34 and external circuitry such as a signal conditioning circuit or an antennae.

FIG. 8 shows an illustrative SAW pressure sensor 34 having a cover 36, corresponding to a portion of cover wafer 10 (FIG. 7), and a base 38 that corresponds to a portion of SAW wafer 22 (FIG. 7). It can be seen that cover 36, base 38 and raised contours 18 may define a pressure reference chamber 26. Base 38 may include a pressure sensing diaphragm 40, formed by the deep etching step discussed previously. SAW pressure sensor 34 may subsequently be provided within a housing or package using, for example, standard plastic encapsulation technology, if desired.

Figure 9:
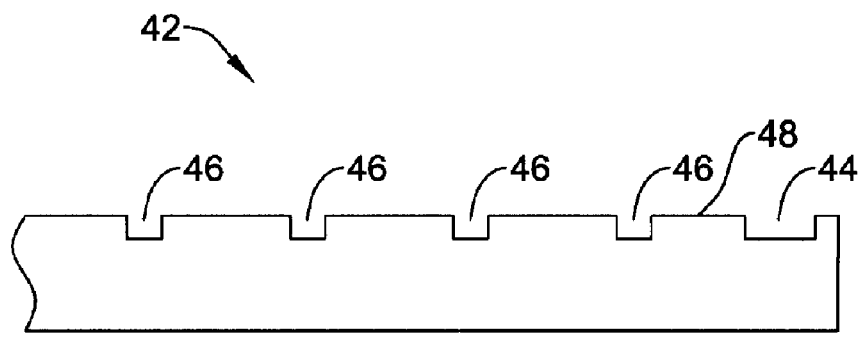
FIG. 9 is a partial cross-sectional side view of a cover wafer in accordance with an illustrative embodiment of the present invention.
Figure 10:
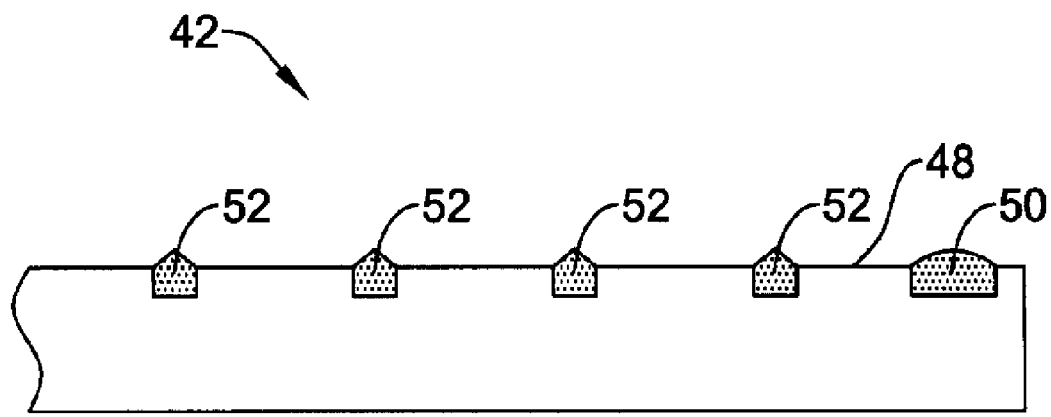
FIG. 10 is a view of the partial cross-section of FIG. 9, showing a subsequent processing step in accordance with an illustrative embodiment of the invention.

FIGS. 9 and 10 show an illustrative cover wafer 42 in accordance with another illustrative embodiment of the present invention. As discussed previously, the spacing determined by the height of glass wall 14 (FIG. 1) can provide SAW pressure sensor 34 with a relatively large pressure reference chamber 26. As a result, variations in chamber volume caused by movement of diaphragm 40 may be relatively small, thereby providing a relatively stable and constant reference pressure. However, this large spacing may make it more difficult to provide an overpressure stop for the diaphragm.

FIG. 9 shows a cover wafer 42, which in some instances may be quartz, with a wall trench 44 and a number of contour trenches 46 formed within a surface 48. Wall trench 44 and contour trenches 46 may be formed using any suitable technique, such as depositing and patterning a mask layer, followed by deep wet etching. In FIG. 10, a glass material 50 is disposed at least partially within wall trench 44 while a number of raised contours 52 are disposed at least partially within contour trenches 46. Glass material 50 may, in some instances, be a glass frit wall, formed using known glass frit techniques such as screen printing. Similarly, raised contours 52 may be formed using known glass frit techniques such as screen printing, but this is not required in all embodiments.

Figure 11:
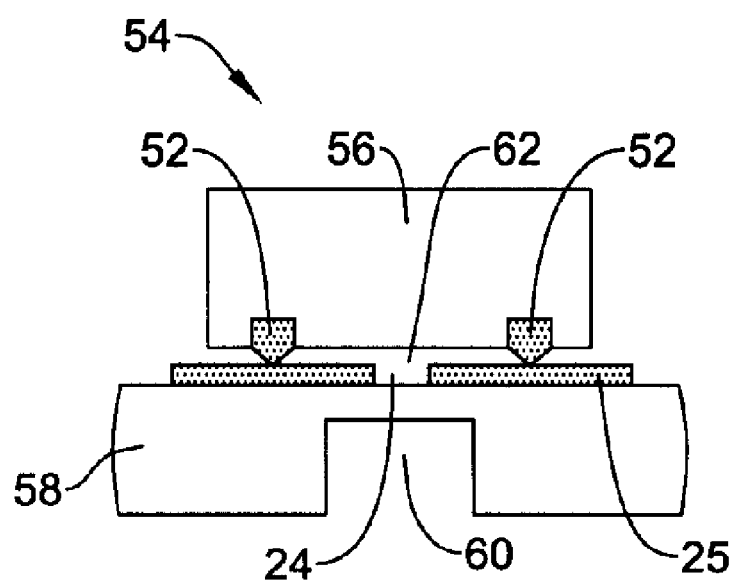
FIG. 11 is a cross-sectional view of a SAW sensor formed in accordance with an illustrative embodiment of the present invention.

It should be appreciated that cover wafer 42 may be used in place of cover wafer 10 (FIG. 1). The resulting stack may be processed as discussed with respect to FIGS. 4 through 7, and may result in a SAW pressure sensor 54 (FIG. 11) having a smaller pressure reference chamber 62. As seen in FIG. 11, SAW pressure 54 has a top 56 corresponding to an appropriate portion of cover wafer 42. A base 58 includes a pressure sensing diaphragm 60 and a SAW transducer 24 (as shown in FIG. 6).

SAW pressure sensor 54 may be considered as including an overpressure stop, as pressure sensor diaphragm 60 can, if subjected to a sufficiently large pressure differential, actually move far enough to physically contact top 56. In this, top 56 functions as an overpressure stop as it may limit physical movement of pressure sensor diaphragm 60.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A method of simultaneously producing a plurality of SAW sensors, the method comprising the steps of:
   providing a SAW wafer, the SAW wafer including a plurality of SAW transducers disposed thereon;
   providing a cover wafer;
   providing a protective wall proximate a periphery of the cover wafer and inbetween the SAW wafer and the cover wafer;
   securing the cover wafer relative to the SAW wafer such that the protective wall, the SAW wafer, and cover wafer collectively define a chamber that surrounds the plurality of SAW transducers;
   after securing the cover wafer to the SAW wafer, forming a patterned metal layer on the SAW wafer and a protective metal layer on the cover wafer;
   etching one or more of the SAW wafer and cover wafer with an etchant;
   wherein the protective wall helps prevent the etchant from entering the chamber.

2. The method of claim 1, wherein the step of providing a protective wall includes providing a glass frit protective wall disposed on the cover wafer.

3. The method of claim 1, further comprising a step of providing a plurality of raised contours between the SAW wafer and the cover wafer such that at least one of the plurality of raised contours surrounds at least one of the plurality of SAW transducers when the cover wafer is secured to the SAW wafer.

4. The method of claim 1, wherein the protective wall defines a separation between the SAW wafer and the cover wafer.

5. The method of claim 1, wherein the step of providing a SAW wafer includes providing a quartz SAW wafer.

6. The method of claim 1, wherein the step of providing a cover wafer includes providing a quartz cover wafer.

7. The method of claim 1, wherein the step of etching one or more of the SAW wafer and the cover wafer includes etching a backside of the SAW wafer to form pressure-sensing diaphragms from the SAW wafer.

8. The method of claim 1, wherein after the etching step, cutting at least one of the SAW wafer and cover wafer.

9. The method of claim 3, wherein the step of providing a cover wafer comprises an additional step of providing a wall trench in the cover wafer, and the step of providing a protective wall comprises providing a glass flit at least partially disposed in the wall trench.

10. A method of simultaneously producing a plurality of SAW sensors, the method comprising the steps of:
providing a SAW wafer, the SAW wafer including a plurality of SAW transducers:
providing a cover wafer:
providing a protective wall between the SAW wafer and the cover wafer;
securing the cover wafer to the SAW wafer such that the protective wall, the SAW wafer, and the cover wafer define a chamber surrounding the plurality of SAW transducers; and
after securing the cover wafer to the SAW wafer, cutting at least one of the SAW wafer and cover wafer, wherein the cutting step includes making a first series of cuts through the cover wafer without cutting the SAW wafer.

11. The method of claim 10, wherein the cutting step further comprises making a second series of cuts through the cover wafer without cutting the SAW wafer, the second series of cuts being parallel to the first series of cuts.

12. The method of claim 11, wherein the cutting step further comprises making a third series of cuts through the cover wafer and the SAW wafer, the third series of cuts being orthogonal to the first and second series of cuts.

13. The method of claim 12, wherein the cutting step further comprises making a fourth series of cuts through the cover wafer and the SAW wafer, the fourth series of cuts being orthogonal to the third series of cuts.

14. The method of claim 9, wherein the step of providing a cover wafer additionally includes providing a plurality of contour trenches in the cover wafer, and the step of providing a plurality of raised contours comprises providing a plurality of raised contours at least partially disposed within the plurality of contour trenches.

15. A method of simultaneously producing a plurality of SAW sensors, the method comprising the steps of;
providing a SAW wafer, the SAW wafer including a plurality of SAW transducers;
providing a cover wafer;
providing a protective wall between the SAW wafer and the cover wafer; and
securing the cover wafer to the SAW wafer such that the protective wall, the SAW wafer, and the cover wafer define a chamber surrounding the plurality of SAW transducers; and
after securing the cover wafer to the SAW wafer, cutting at least one of the SAW wafer and cover wafer, wherein the cutting step includes cutting across the protective wall to expose at least part of the chamber.

16. The method of claim 15, further comprising a step of etching at least one of the SAW wafer and cover wafer after the securing step but prior to the cutting step.

17. A method of simultaneously producing a plurality of devices, the method comprising the steps of:
providing a device wafer, the device wafer including a plurality of devices;
providing a cover wafer;
providing a plurality of raised contours between the device wafer and the cover wafer such that at least one of the plurality of raised contours extends around a subset of the plurality of devices to form, in combination with the device wafer and the cover wafer, a sealed cavity housing the subset of the plurality of devices;
providing a protective wall proximate a periphery of the cover wafer and in between the device wafer and the cover wafer;
securing the cover wafer relative to the device wafer such that the protective wall, the device wafer, and the cover wafer define a chamber surrounding the plurality of devices; and
after securing the cover wafer to the device wafer, etching one or more of the device wafer and cover wafer with an etchant, wherein the protective wall helps prevent the etchant from reaching the plurality of raised contours and/or the plurality of devices located within the chamber; and
after securing the cover wafer to the device wafer, dicing at least one of the device wafer and cover wafer, wherein the step of dicing includes cutting across the protective wall to expose at least part of the chamber.

* * * * *

UNITED STATES PATENT AND TRADEMARK OFFICE
CERTIFICATE OF CORRECTION

PATENT NO. : 7,651,879 B2  Page 1 of 1
APPLICATION NO. : 11/164845
DATED : January 26, 2010
INVENTOR(S) : Cobianu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Twenty-third Day of November, 2010

David J. Kappos
*Director of the United States Patent and Trademark Office*